(12) United States Patent
Azar

(10) Patent No.: US 7,659,897 B1
(45) Date of Patent: Feb. 9, 2010

(54) SYSTEM, METHOD, AND COMPUTER PROGRAM PRODUCT FOR VIDEO BENCHMARKING

(75) Inventor: Hassane S. Azar, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 454 days.

(21) Appl. No.: 11/478,927

(22) Filed: Jun. 30, 2006

(51) Int. Cl.
G06F 15/00 (2006.01)
G06T 1/00 (2006.01)
G06F 13/14 (2006.01)
G01N 31/00 (2006.01)
G06F 11/30 (2006.01)
G06F 9/45 (2006.01)

(52) U.S. Cl. .................. 345/501; 345/520; 702/32; 702/182; 703/22

(58) Field of Classification Search .................. 702/32, 702/182; 703/22; 345/520, 501
See application file for complete search history.

(56) References Cited

U.S. PATENT DOCUMENTS

| | | | |
|---|---|---|---|
| 5,446,492 A * | 8/1995 | Wolf et al. .................. 348/192 |
| 5,808,908 A * | 9/1998 | Ghahramani ................ 702/182 |
| 6,754,273 B1 * | 6/2004 | Sackstein et al. ........ 375/240.21 |
| 6,829,301 B1 * | 12/2004 | Tinker et al. ........... 375/240.12 |
| 7,027,972 B1 * | 4/2006 | Lee .............................. 703/22 |
| 7,519,507 B1 | 4/2009 | Herz .......................... 702/182 |
| 2002/0101535 A1 * | 8/2002 | Swan .......................... 348/448 |
| 2003/0039409 A1 * | 2/2003 | Ueda .......................... 382/298 |
| 2004/0123297 A1 * | 6/2004 | Flautner et al. ............. 718/102 |
| 2004/0190617 A1 * | 9/2004 | Shen et al. ............. 375/240.16 |
| 2005/0010378 A1 * | 1/2005 | Zeidman et al. ................ 703/1 |
| 2005/0232497 A1 * | 10/2005 | Yogeshwar et al. ......... 382/232 |
| 2006/0090010 A1 * | 4/2006 | Qin .............................. 709/246 |
| 2006/0174233 A1 * | 8/2006 | Minadakis .................. 717/140 |
| 2007/0074266 A1 * | 3/2007 | Raveendran et al. ........ 725/135 |

OTHER PUBLICATIONS

Dong et al.; AVP: A Highly Efficient Real-Time Protocol for Multimedia Communications on Internet; International Conference on Information Technology: Coding and Computing (ITCC); 2001; pp. 280-284.*
Tomov et al.; Benchmarking and Implementation of Probability-based Simulations on Programmable Graphics Cards; Feb. 2005; Computers & Graphics; vol. 29, No. 1; pp. 71-80.*
U.S. Appl. No. 11/510,429, filed Aug. 24, 2006.

* cited by examiner

Primary Examiner—Xiao M Wu
Assistant Examiner—David T Welch
(74) Attorney, Agent, or Firm—Zilka-Kotab, PC

(57) ABSTRACT

A system, method, and computer program product are provided for determining a performance associated with a graphics processor. In use, at least one aspect of a usage of a graphics processor is identified. Further, a performance of a video output of the graphics processor is determined, based on the identified aspect.

19 Claims, 5 Drawing Sheets

SYSTEM, METHOD, AND COMPUTER PROGRAM PRODUCT FOR VIDEO BENCHMARKING

FIELD OF THE INVENTION

The present invention relates to video processing, and more particularly to benchmarking video processing capabilities.

BACKGROUND

Benchmarking typically refers to a test used to compare various aspects of computer-related hardware and/or software. Trade magazines and other organizations have developed various benchmark tests, which may be used when reviewing a class of products. One particular type of benchmarking is video benchmarking which tests different aspects of a graphics processor and, in particular, the manner in which the graphics processor processes video. Typically, video benchmarking can involve the testing of three primary aspects of video processing, namely visual quality, performance, and energy efficiency (which is, at least in part, a function of performance). Note prior art FIG. 1A.

When testing for performance and, indirectly, energy efficiency, video benchmarking typically involves the enablement of each of a plurality of graphics processor stages (e.g. scaling, dithering, noise reduction, etc.), after which a video playback application is executed. Upon execution, a usage of a central processing unit (CPU) working conjunction with the graphics processor is monitored. This is traditionally accomplished utilizing an operating system CPU monitoring tool or the like. If such CPU usage is high or higher than another system, such indicates that the performance of the graphics processor is incapable of offloading the CPU in an effective manner.

In addition to monitoring CPU usage, a user of the benchmark may visually inspect frame drops. Frame drops refer to frames that are ultimately not displayed due to a lack of performance of the graphics processor. Thus, a performance rating of a graphics processor lowers as the number of frame drops grows.

Unfortunately, the foregoing types of video benchmarking have been plagued by inaccuracies, confusion, subjectivity, etc., making it more difficult to rate graphics processors. For example, performance may change from one application to the next. Further, the aforementioned frame drops may sometimes be hard to detect visually, especially in borderline cases.

There is thus a need for overcoming these and/or other problems associated with the prior art.

SUMMARY

A system, method, and computer program product are provided for determining a performance associated with a graphics processor. In use, at least one aspect of a usage of a graphics processor is identified. Further, a performance of a video output of the graphics processor is determined, based on the identified aspect.

BRIEF DESCRIPTION OF THE DRAWINGS

Prior art

DETAILED DESCRIPTION

Figure 1A:
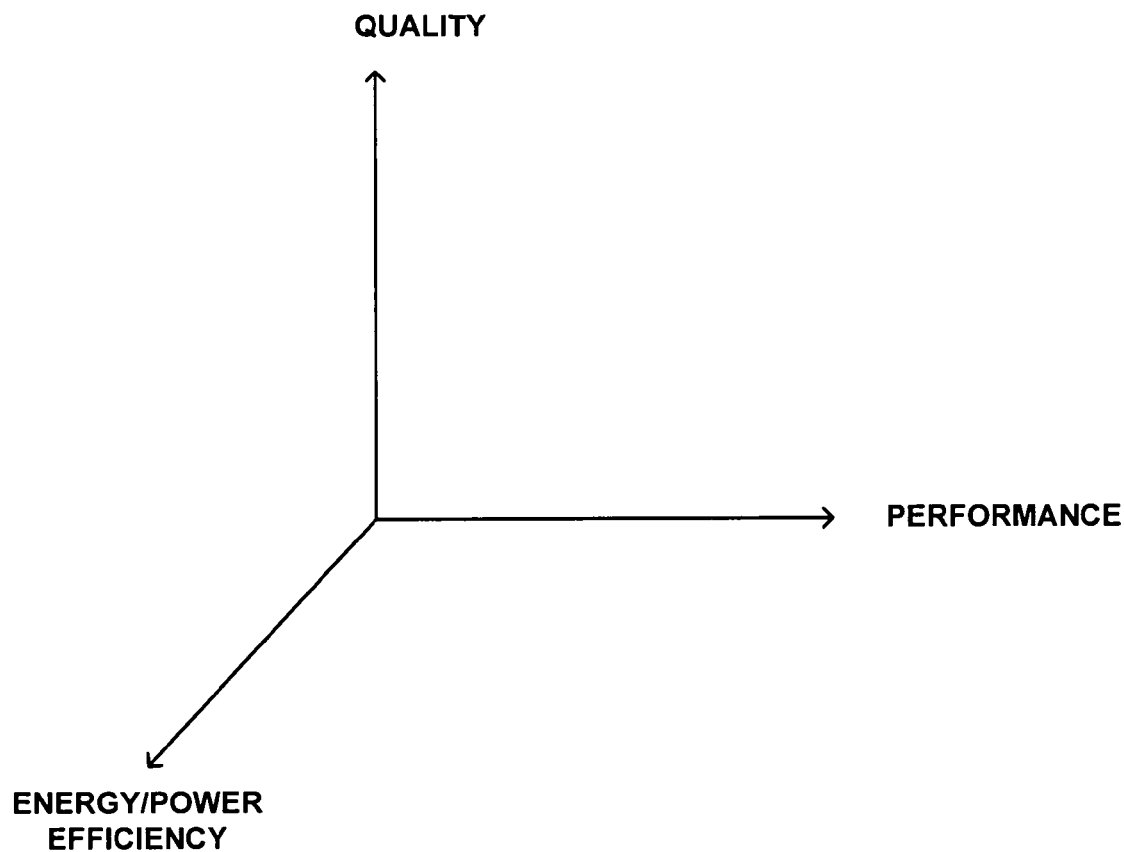
FIG. 1A illustrates various parameters associated with video benchmarking, in accordance with the prior art.
Figure 1B:
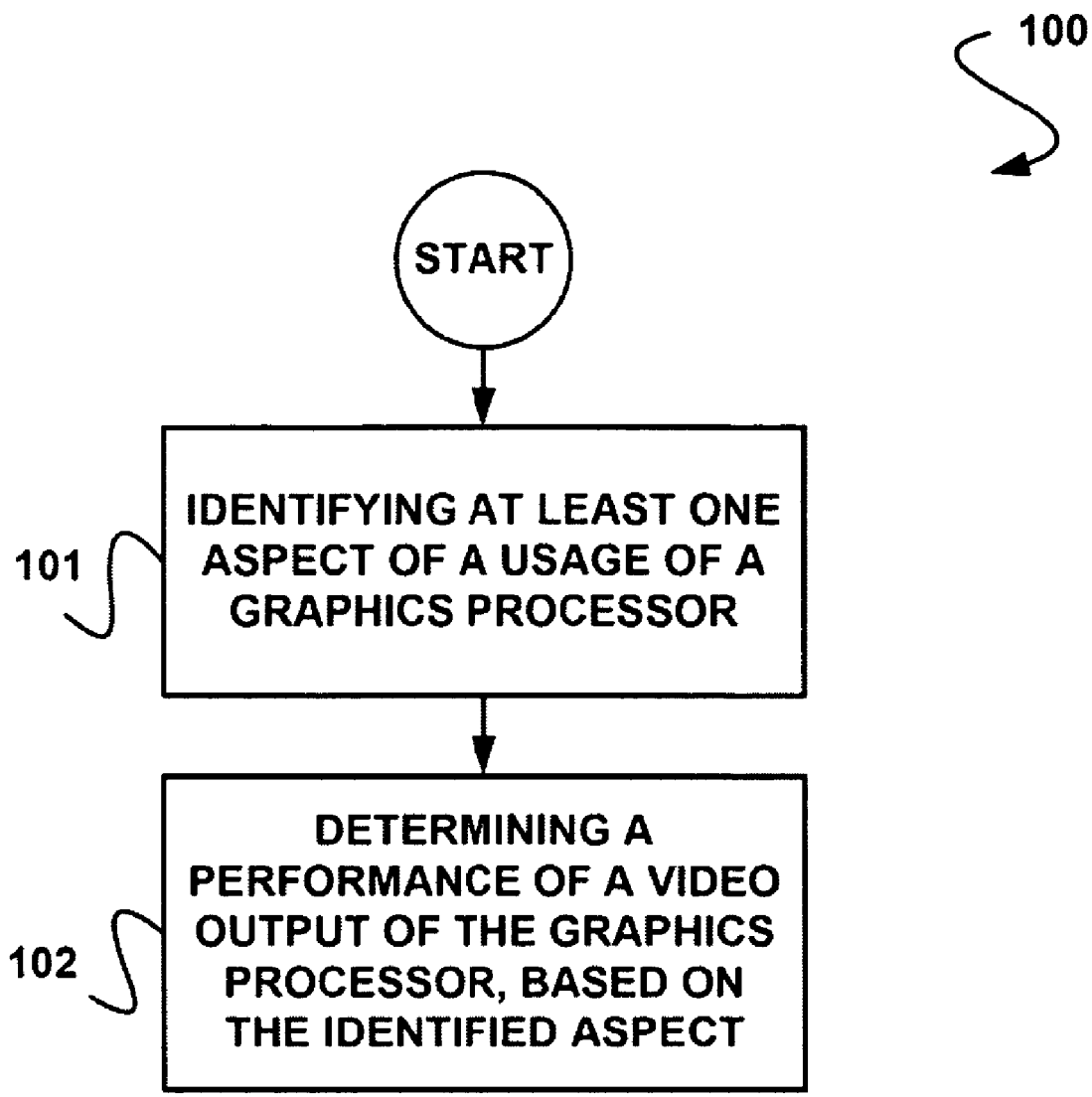
FIG. 1B shows a method for determining a performance associated with a graphics processor, in accordance with one embodiment.

FIG. 1B shows a method 100 for determining a performance associated with a graphics processor, in accordance with one embodiment. As shown, at least one aspect of a usage of a graphics processor is identified. Note operation 101. Such aspect of usage may refer to a quality level of video processing being performed by the graphics processor, a number of frames output per unit of time in association with the video output, etc. It should be noted that, in the context of the present description, the aspect of usage may refer to any aspect associated with a use of the graphics processor.

In one embodiment, the graphics processor may include a plurality of shader modules, a rasterization module, etc. Still yet, each of the foregoing modules may even be situated on a single semiconductor platform to form a graphics processing unit (GPU). Of course, in the context of the present description, the graphics processor may refer to any hardware processor capable of producing a video output.

In operation 102, a performance of the video output of the graphics processor is determined, based on the identified aspect(s). In one embodiment where the aspect of usage involves the quality level of video processing being performed by the graphics processor and the number of frames output per unit of time in association with the video output, such performance may be determined as a function of such aspects by a multiplication operation, convolution, and/or any other function, for that matter. Of course, any determination of performance is contemplated where the same is, at least in part, a function of the aspect of usage identified in operation 101.

To this end, a performance of the video output of the graphics processor may be determined based on graphics processor usage, in addition to or instead of central processing unit (CPU) usage, etc. Still yet, in various optional embodiments which will now be set forth, such performance may even be scored for ranking purposes.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
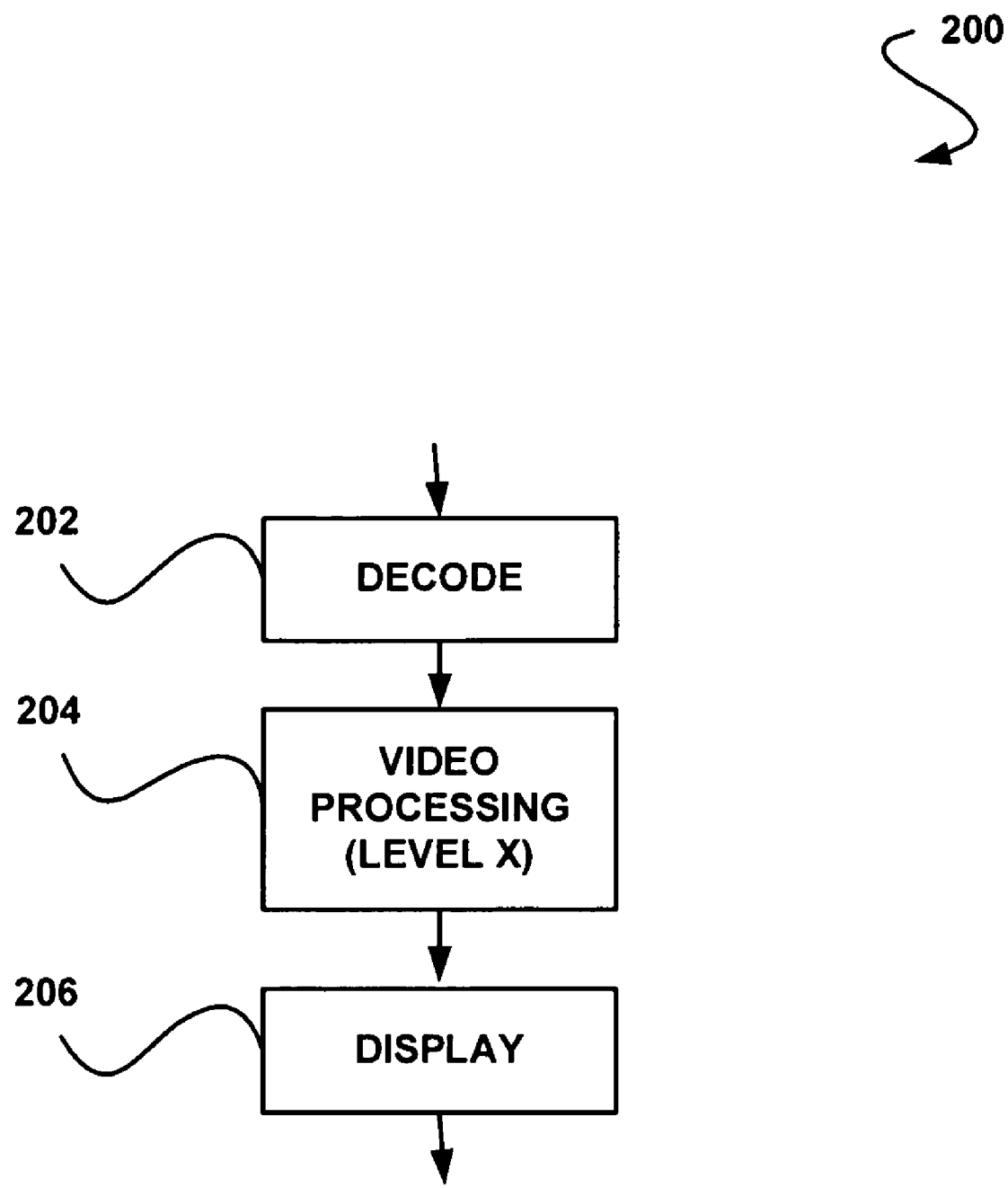
FIG. 2 shows a system for graphics processing, in accordance with one embodiment.

FIG. 2 shows a system 200 for graphics processing, in accordance with one embodiment. As an option, the present system 200 may be the subject of the method 100 of FIG. 1B. Of course, however, the system 200 may be used in any desired environment. Still yet, the above definitions apply during the following description.

As shown, the system 200 includes a decode module 202 for decoding purposes. Such decoding may include the transformation and rendering of primitives (e.g. triangles, lines, points, etc.). Such decode module 202 is a component of the system 200 which significantly impacts a quality of the resultant video output. In other embodiments, the decode module 202 may be capable of processing multiple streams (e.g. two high-definition streams, etc.).

Further included is a post-decoding video processing module 204 which, in turn, feeds a display 206. The video processing module 204 may include a plurality of stages each with a corresponding processing capability. Just by way of example, such stages may include a de-interlacing stage, sharpening stage, color processing stage, scaling stage, noise reduction stage, inverse telecine stage, etc. As will soon become apparent, enabling and disabling such various stages may impact a quality level of the video output.

Since one or more of such stages may be enabled for different applications, etc., the video processing module 204 is more programmable and may be varied more than the decode module 202. This variability may put pressure on the decode module 202, display 206, a CPU (not shown), etc. For example, if all of the aforementioned stages are performed, additional CPU usage may be required, frames may be dropped, etc., depending on the capabilities of the graphics processor.

While the system 200 is shown to include decoding, etc., it should be noted that, in other embodiments, such decoding may be supplemented or substituted with encoding and pre-encoding video processing. Such processing may also be benchmarked utilizing the techniques disclosed herein.

Figure 3:
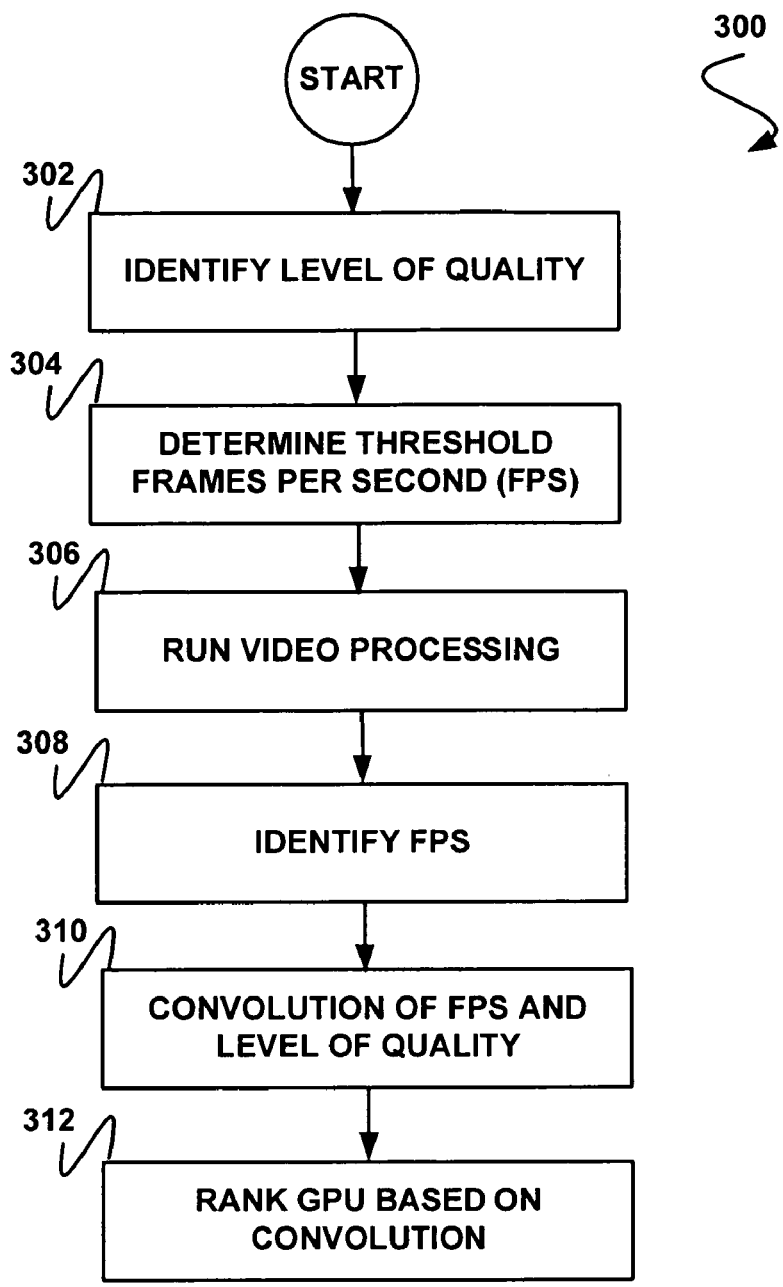
FIG. 3 shows a method for determining a performance associated with a graphics processor, in accordance with another embodiment.

FIG. 3 shows a method 300 for determining a performance associated with a graphics processor, in accordance with another embodiment. As an option, the present method 300 may be carried out in the context of the system 200 of FIG. 2. Of course, however, the method 300 may be implemented in any desired environment. Again, the definitions introduced hereinabove apply during the following description.

As shown, a level of quality is identified. See operation 302. Such level of quality may be identified in any desired manner that relates to a quality of a video output. In one embodiment, a plurality of the quality levels may be pre-defined.

Specifically, each pre-defined quality level may correspond to a set of one or more video processing capabilities enabled on an associated graphics processor. Note, for example, the various stages of the video processing module 204 of FIG. 2. For reasons that will soon become apparent, each of such quality levels may be assigned a value. Table 1 illustrates one exemplary set of pre-defined quality levels.

TABLE 1

Level 0: Simple de-interlacing + simple scaling (baseline)
Level 1: Advanced de-interlacing + simple scaling
Level 2: Inverse telecine (InvTC) + advanced de-interlacing + simple scaling
Level 3: Inverse telecine (InvTC) + advanced de-interlacing + advanced scaling Of course, such data structure is set forth for illustrative purposes only and should not be construed as limiting in any way, since any pre-defined (or even not pre-defined) quality levels may be employed in the context of the present embodiment.

Next, in operation 304, a threshold number of frames output per unit of time in association with the video output is determined. While, in one embodiment, the unit of time includes seconds [i.e. number of frames output per second (FPS), etc.], it should be noted that any unit of time may be used. Further, such threshold may be set as a function of when frames will be dropped. Frame drops refer to frames that are ultimately not displayed due to a lack of a predetermined level of performance of the graphics processor.

In one embodiment, such threshold may be set to 60, which correlates with a display of a frame, at minimum, each 16.67 ms (i.e. 60 Hz). In such embodiment, if a frame is not displayed each 16.67 ms, the threshold will not be met. Of course, the foregoing figure may be altered based on various factors such as, for example, whether decoding is interlaced, a rate of source content input, etc.

For instance, the threshold may be set based on Equation #1 below.

$$\text{threshold} = (1 + k) * \text{source rate} \quad \text{Equation \#1}$$

where $k$ = a factor (e.g. 10%) for providing a guard band

The aforementioned factor "k" reflects an inefficiency level of the graphics processor. Ideally, the factor "k" is zero, and anything higher indicates a level of inefficiency in the graphics processor. Hardware/software designs may thus be optimized for minimizing the factor "k," eventually to zero.

In another embodiment, such threshold may be different for different quality levels. For example, the threshold may be set as a function of when frames will be dropped for a particular quality level, etc. Thus, in a situation where more video processing capabilities are enabled, a lower threshold may be set, in view of the additional strain to which a graphics processor will be subjected.

With the quality level identified, video processing is run. See operation 306. In one embodiment, a speed of the video processing is maximized, along with a decoding speed, etc. To this end, the graphics processor is run at maximum capacity.

Further, in an embodiment where CPU usage is not employed for benchmarking purposes, use of a timestamp that is traditionally used to govern/limit a rate of input to the graphics processor may be avoided. This, in turn, maximizes the rate of input to the graphics processor. Specifically, video playback is conventionally based on the delivery of video frames with a specific timing controlled by a player application using timestamps. By avoiding the use of such timestamp in the foregoing manner, the video frames may be inputted faster, thus optimally testing the performance of the graphics processor.

Next, a number of frames output per unit of time in association with the video output is identified. See operation 308. To this end, a performance of the graphics processor may be determined based on the quality level and/or the number of frames output per unit of time (e.g. FPS, etc.).

For example, the graphics processor may be benchmarked against the aforementioned benchmark threshold by simply comparing the FPS value against the threshold. Table 2 illustrates an example of how such comparison may be used to benchmark a particular graphics processor.

TABLE 2

If FPS < 60, very bad
If FPS > 60, good

The FPS may thereby serve as a score for performance at a certain quality level. For instance, if FPS>60, a user may be comfortable employing all available video processing capabilities at a particular quality level.

In another example of use (with k=10% and a source rate of 60 FPS), the threshold may be determined to be 66 based on Equation #1 above. In such example, a FPS value from operation 308 that exceeds such threshold (say 130 FPS) may indicate how much headroom is available to add more video processing capabilities without affecting a playback in normal mode (e.g. with the aforementioned timestamps, etc.). Specifically, in the present example, the headroom may be 97% [((130−66)/66]. In other embodiments where power consumption is important, an idle time of the graphics processor may be calculated. Of course, battery life may be a function of such idle time. Thus, in the present example, such idle time would be 49% [(130−66)/130], thus providing an indication of battery life, etc.

In another embodiment for providing a single final benchmark, the performance of a graphics processor may be determined by scoring the performance based the number of frames output per unit of time, in addition to the quality level identified in operation 302. As indicated in operation 310, the quality level and number of frames may even be convoluted for such purposes. It should be noted, however, that any type of function (e.g. simply multiplication, etc.) may be used to provide a scoring value that reflects both of such aspects.

By this design, the performance of a graphics processor may be ranked among that of a plurality of other graphics processors, based on the scoring value. See operation 312. Using such scoring value, a user may more easily discern the performance of the graphics processor. Still yet, the present benchmarking may be used to automatically configure a system by first reviewing a score of a graphics processor and, for various applications, enabling certain stages/features thereof, distributing tasks between the graphics processor and the CPU, etc., based on such score. Even still, the benchmarking may be used for marketing purposes.

Figure 4:
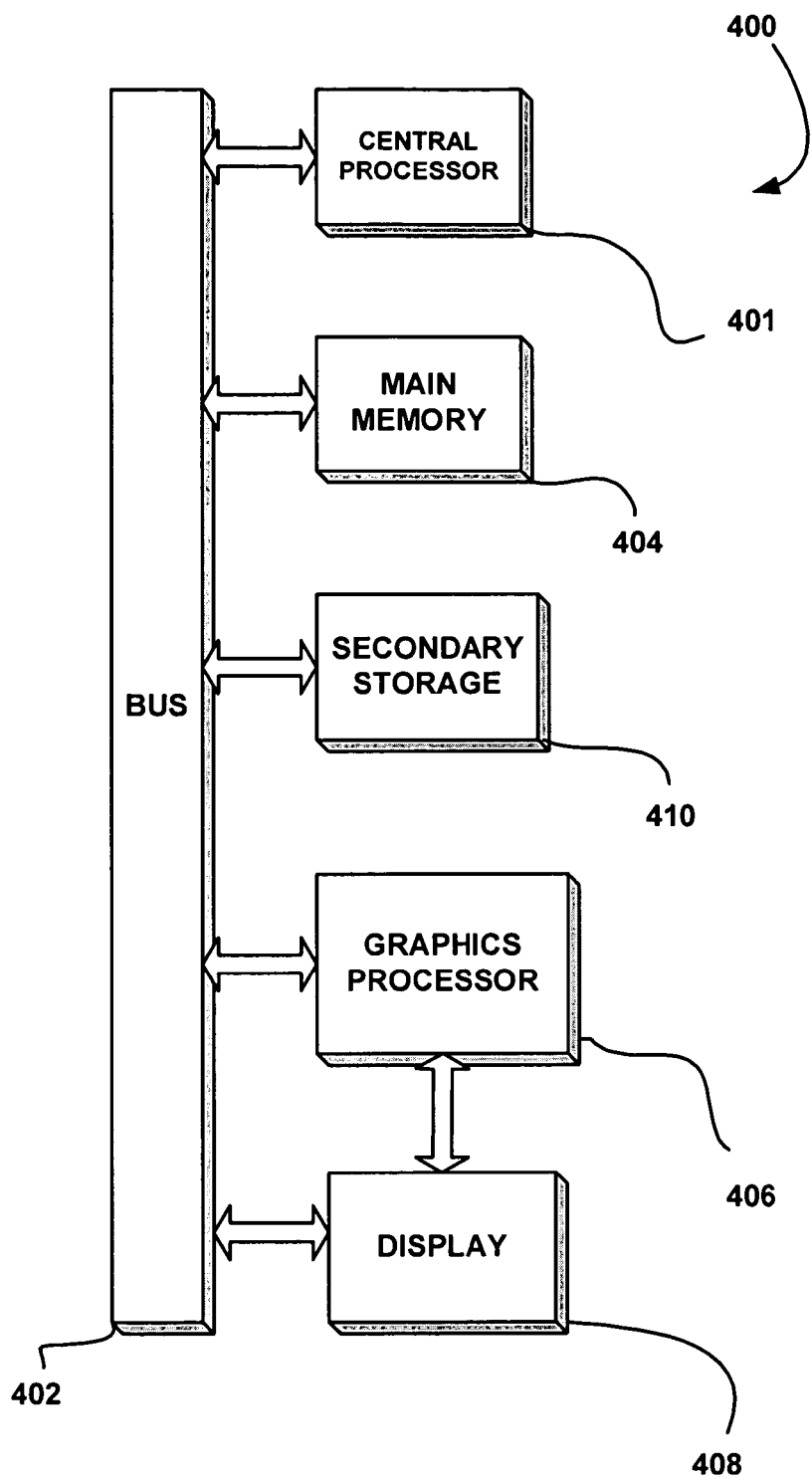
FIG. 4 illustrates an exemplary computer system in which the various architecture and/or functionality of the various previous embodiments may be implemented.

FIG. 4 illustrates an exemplary computer system 400 in which the various architecture and/or functionality of the various previous embodiments may be implemented. As shown, a computer system 400 is provided including at least one host processor 401 which is connected to a communication bus 402. The computer system 400 also includes a main memory 404. Control logic (software) and data are stored in the main memory 404 which may take the form of random access memory (RAM).

The computer system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the computer system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying at least one aspect of a usage of a graphics processor; and
   determining a performance of a video output of the graphics processor, based on the identified at least one aspect;
   wherein a number of frames output per unit of time in association with the video output is identified;
   wherein the performance is determined based on an identified quality level and the number of frames output per unit of time;
   wherein the identified quality level corresponds to a pre-defined quality level selected from a set of pre-defined quality levels including at least one of level 0, which includes simple de-interlacing and simple scaling, level 1, which includes advanced de-interlacing and simple scaling, level 2, which includes inverse telecine, advanced de-interlacing, and simple scaling, and level 3, which includes inverse telecine, advanced de-interlacing, and advanced scaling.

2. The method as recited in claim 1, wherein the identified quality level includes a quality level of video processing being performed by the graphics processor.

3. The method as recited in claim 2, wherein a plurality of the quality levels is defined each corresponding to a set of video processing capabilities enabled on the graphics processor.

4. The method as recited in claim 3, wherein the video processing capabilities include at least one of de-interlacing, sharpening, color processing, and scaling.

5. The method as recited in claim 3, wherein the video processing capabilities include de-interlacing, sharpening, color processing, and scaling.

6. The method as recited in claim 2, wherein a speed of the video processing is maximized.

7. The method as recited in claim 1, wherein the unit of time includes seconds.

8. The method as recited in claim 1, wherein the performance is determined by scoring the performance based on the quality level and the number of frames output per unit of time.

9. The method as recited in claim 8, wherein the graphics processor is ranked among a plurality of other graphics processors.

10. The method as recited in claim 8, wherein the graphics processor is ranked among a plurality of other graphics processors based on the scoring.

11. The method as recited in claim 8, wherein the scoring includes multiplying a value associated with the quality level, and the number of frames output per unit of time.

12. The method as recited in claim 2, wherein the video processing includes decoding and post-decoding video processing.

13. The method as recited in claim 12, wherein the decoding includes multiple streams.

14. The method as recited in claim 2, wherein the video processing includes encoding and pre-encoding video processing.

15. The method as recited in claim 8, wherein the quality level and the number of frames output per unit of time are convoluted for the determination.

16. A computer program product embodied on a computer readable medium, comprising:
 computer code for identifying at least one aspect of a usage of a graphics processor; and
 computer code for determining a performance of a video output of the graphics processor, based on the identified at least one aspect;
 wherein the computer program product is operable such that a number of frames output per unit of time in association with the video output is identified;
 wherein the computer program product is operable such that the performance is determined based on an identified quality level and the number of frames output per unit of time;
 wherein the computer program product is operable such that the identified quality level corresponds to a pre-defined quality level selected from a set of pre-defined quality levels including at least one of level 0, which includes simple de-interlacing and simple scaling level 1, which includes advanced de-interlacing and simple scaling, level 2, which includes inverse telecine, advanced de-interlacing, and simple scaling, and level 3, which includes inverse telecine, advanced de-interlacing, and advanced scaling.

17. A system, comprising
 a graphics processor; and
 an application executing utilizing the graphics processor;
 wherein a performance of a video output of the graphics processor is determined based on a usage of the graphics processor;
 wherein the system is operable such that a number of frames output per unit of time in association with the video output is identified;
 wherein the system is operable such that the performance is determined based on an identified quality level and the number of frames output per unit of time;
 wherein the system is operable such that the identified quality level corresponds to a pre-defined quality level selected from a set of pre-defined quality levels including at least one of level 0, which includes simple de-interlacing and simple scaling, level 1, which includes advanced de-interlacing and simple scaling, level 2, which includes inverse telecine, advanced de-interlacing, and simple scaling, and level 3, which includes inverse telecine, advanced de-interlacing, and advanced scaling.

18. The system as recited in claim 17, wherein the graphics processor is in communication with a display and a central processing unit via a bus.

19. A method, comprising:
 identifying at least one aspect of a usage of a graphics processor; and
 determining a performance of a video output of the graphics processor, based on the identified at least one aspect;
 wherein a number of frames output per unit of time in association with the video output is identified;
 wherein the performance is determined based on an identified quality level and the number of frames output per unit of time;
 wherein the identified quality level corresponds to a pre-defined quality level selected from a set of pre-defined quality levels including level 0, which includes simple de-interlacing and simple scaling, level 1, which includes advanced de-interlacing and simple scaling, level 2, which includes inverse telecine, advanced de-interlacing, and simple scaling, and level 3, which includes inverse telecine, advanced de-interlacing, and advanced scaling.

* * * * *